United States Patent [19]

Borsh et al.

[11] Patent Number: 5,084,596
[45] Date of Patent: Jan. 28, 1992

[54] ELECTRICAL BOX

[75] Inventors: Richard J. Borsh, Chagrin Falls; William M. Chambers, Valley City; Philip G. Bartone, Conneaut, all of Ohio

[73] Assignee: The Lamson & Sessions Co., Cleveland, Ohio

[21] Appl. No.: 532,445

[22] Filed: Jun. 4, 1990

[51] Int. Cl.5 .............................................. H02G 3/08
[52] U.S. Cl. ...................................... 174/53; 174/57; 248/220.1; 361/334; 361/356
[58] Field of Search ...................... 174/53, 57; 220/3.7; 361/334, 356, 359, 362, 417, 419, 420, 427; 248/220.1

[56] References Cited

U.S. PATENT DOCUMENTS 4,908,733  3/1990  Zachrei et al. ...................... 361/356

Primary Examiner—Leo P. Picard
Assistant Examiner—David A. Tone
Attorney, Agent, or Firm—Fay, Sharpe, Beall, Fagan, Minnich & McKee

[57] ABSTRACT

An enclosure for electrical components comprises an electrically non-conductive molded plastic liquid tight rectangular box-like container having an upwardly open end and defined by side walls joined at upwardly extending corners. Each of the upwardly extending corners includes a vertically extending channel with a vertical access slot. The access slot is narrower than the associated channel to provide a fastener receiving opening for mounting electrical structure within the enclosure. Fasteners are mounted for vertical adjustment in the channels to allow selective positioning of panels or components in the enclosure.

8 Claims, 2 Drawing Sheets

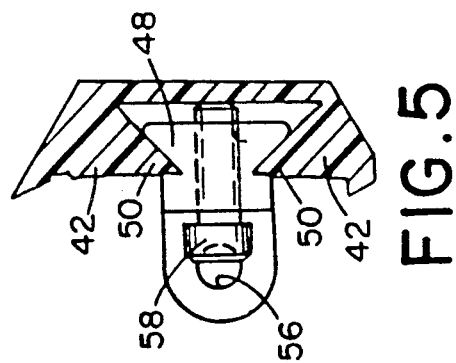
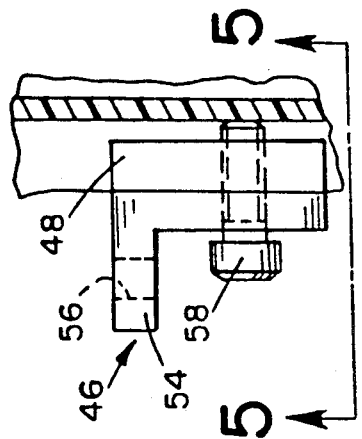
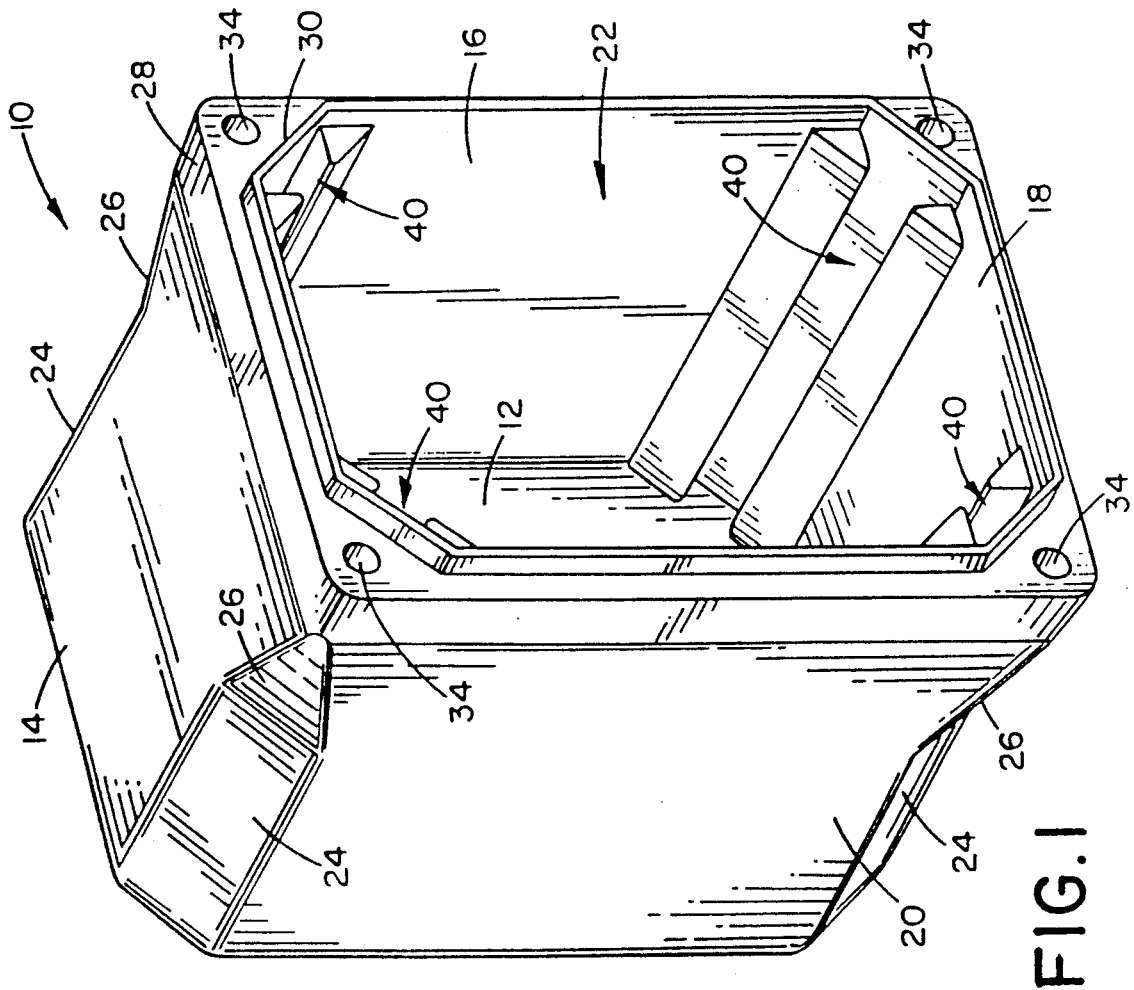

ELECTRICAL BOX

BACKGROUND OF THE INVENTION

The subject invention is directed toward the art of enclosures and, more particularly, to an enclosure for electrical and electronic components and associated wiring and circuitry.

In the electrical arts, it is often necessary to provide housings and boxes for many different components and their associated wiring and control circuitry. Typically, the components must be fastened in place and often several different components must be mounted in the same housing in rigid and/or spaced relationship.

In a great many instances, the total production run of any one particular combination of components is somewhat limited and the cost of producing a custom housing is not economically justified. In such instances, housings having an ability to be adapted to different component mounting arrangements are used. Similarly, when performing field installation of various electrical wiring and control systems, it is often necessary to install many different combinations of components. In order to maintain the number of different housings and enclosures required to a reasonable level, it is desirable to have enclosures which are extremely flexible.

The subject invention is directed to a housing or enclosure structure which satisfies the above-discussed needs in a simple and economical manner.

SUMMARY OF THE INVENTION

In particular, the subject invention provides an enclosure for electrical components which is an electrically nonconductive molded plastic unitary structure having a rectangular bottom wall and four upwardly extending side walls integral therewith. The side walls are joined to the bottom wall to form a liquid tight rectangular box-like container having an upwardly open end and four upwardly extending corners at the junctures of the side walls. Each of the upwardly extending corners includes a separate pair of rib members associated therewith and extending from the bottom wall to the open end. The respective ribs of each pair of ribs are located on opposite sides of the associated corner with each rib having a terminal end which is generally parallel to the associated corner and extends toward and terminates parallel to the terminal end of the associated rib to define a vertically extending channel with a vertical access slot. The access slot is narrower than the associated channel to provide a fastener receiving means for allowing electrical components and associated structure to be mounted within the enclosure through the use of the vertically extending slots.

Preferably, and in accordance with a more limited aspect of the invention, the ribs are molded integrally with the side walls and have a tapered cross-section in planes parallel to the bottom wall. The tapered cross-section is arranged so that the slot can receive a correspondingly shaped support bracket which can be suitably clamped within the slot.

In accordance with a further aspect of the invention, each pair of ribs is generally parallel to every other pair of ribs and adjustable connecting means are releasably clamped to the ribs.

Preferably, each corner of the rectangular box-like structure includes a pair of the ribs positioned to define a separate vertically extending channel in each corner. Thus, interior panels, dividing walls, and the like, can be mounted within the box-like structure and rigidly secured from each corner of the molded plastic enclosure.

Accordingly, a primary object of the invention is the provision of a molded plastic enclosure structure which can be used for housing and supporting a variety of different electrical structures without the necessity of providing a different interior design.

A still further object of the invention is the provision of a general purpose enclosure or box which can be readily adapted for housing many different electrical components and structures A still further object of the invention is the provision of an enclosure or box structure of the general type described wherein the corners of the box are provided with the vertically extending clamp or fastener receiving slots which allow selective mounting and positioning of associate electrical structures within the box.

A still further object is the provision of a structure of the general type described which is extremely rigid and simple to use.

BRIEF DESCRIPTION OF THE DRAWINGS

The above and other objects and advantages will become apparent from the following description when read in conjunction with the accompanying drawings wherein:

FIG. 1 is a pictorial view of the molded plastic enclosure or housing formed in accordance with the subject invention;

FIG. 4 is a side elevational view of a fastener clamp or support bracket useful in the enclosure of FIG. 1 (the view is taken on line 4—4 of FIG. 2); and FIG. 5 is a view taken on line 5—5 of FIG. 4.

DETAILED DESCRIPTION OF THE PREFERRED EMBODIMENT

Figure 3:
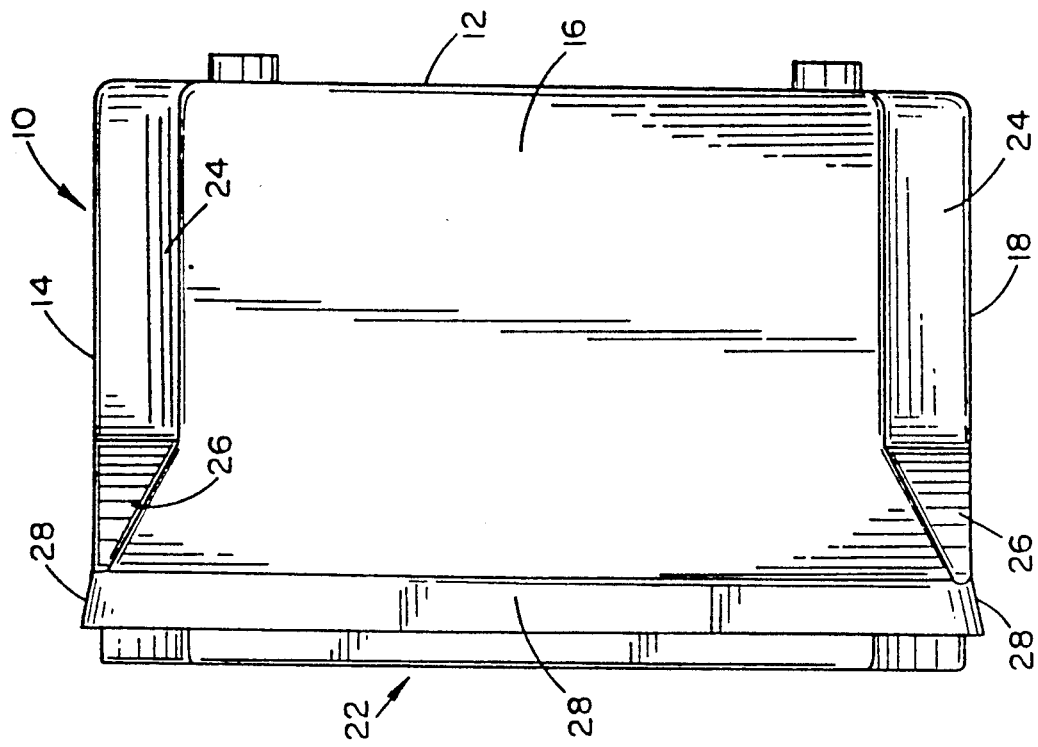
FIG. 3 is a side elevational view taken on line 3—3 of FIG. 2.
Figure 2:
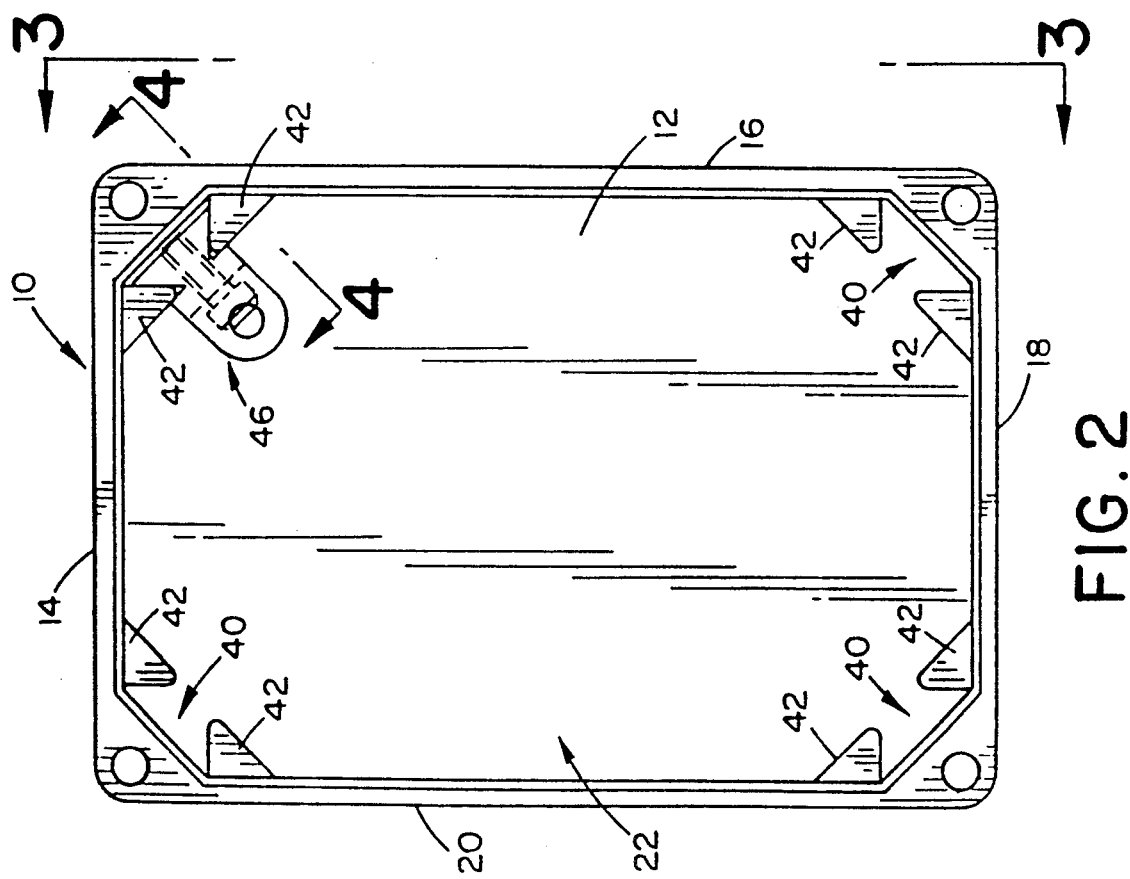
FIG. 2 is a plan view looking into the interior of the enclosure shown in FIG. 1.

Referring more particularly to the drawings wherein the showings are for the purpose of illustrating a preferred embodiment of the invention only, and not for the purpose of limiting same, FIGS. 1 through 3 show the overall arrangement, construction and design, of a molded plastic enclosure or housing structure 10 which generally comprises a rectangular bottom wall 12 and four side walls 14, 16, 18, and 20 which are integral with the bottom wall and extend generally perpendicular thereto. The bottom wall 12 and the integral side walls 14, 16, 18, and 20 cooperate to define a box-like, liquid tight container having an open end 22. Referring in particular to FIGS. 1 and 3, it will be noted that the corners of the enclosure 10 are defined by flat sections 24 which extend diagonally between the adjacent side walls. At their upper end, the corners include a transition surface 26. Additionally, an outwardly flared section 28 (see FIG. 3) extends completely about the open end of the enclosure. The combination of the surfaces 24, 26, and 28 function to deflect water runoff away from the open end of the enclosure. This assists in keeping water and other liquids away from any covers or the like applied to the open end or side of the container.

With respect to the use of covers or lids, the subject embodiment preferably includes a relatively narrow outwardly extending wall or flange-like portion 30 which encircles the open end 22. This provides a sealing lip or rim for engagement with gaskets or the like suitably carried in any connecting lid or cover structure (not shown). To facilitate mounting or connection of covers, lids, or the like, the upper ends of the corners are provided with suitable fastener receiving openings 34 as shown. The openings 34 can be unthreaded for use with self-tapping screws. Alternately, they can be tapped to provide internal threads or molded with metal thread defining inserts therein. The particular arrangement of the corners and their fastener receiving openings form no part of the present invention.

As previously discussed, such enclosure boxes are used for housing electrical components and control circuits and should preferably be capable of readily being adapted to a variety of different electrical structures and usages. In the subject embodiment, means are provided for allowing ready installation of dividing panels, support panels, and the like. Additionally, the design is such that individual electrical components, control elements, and similar structures can be mounted rigidly and at different levels within the enclosure. For this purpose, the subject device is provided with vertically extending mounting slots positioned in the corners of the enclosure. As will become apparent, any particular number of the fastener receiving slots or recesses could be provided in various locations. However, in the subject embodiment, one recess is provided in each of the four corners. Specifically, as best shown in FIGS. 1 and 2, a separate longitudinally extending fastener receiving recess 40 is formed in each of the individual corners. As best shown in FIG. 1, each recess preferably extends from the bottom wall 12 to the open end 22. Moreover, each of the recesses 40 is defined by a pair of rib members 42 which are formed integrally with the side walls. In particular, as best illustrated in FIG. 2, each of the ribs 42 extend outwardly from an associated side wall and have a generally tapered cross-section as shown. The outer free ends of the ribs extend toward one another and are spaced apart so that each channel or recess 40 opens to the interior box through a significantly narrower vertical access slot. This access slot allows and facilitates connection of suitable mounting brackets, fasteners, and the like.

The preferred form of connector and mounting bracket is illustrated in FIGS. 2, 4, and 5. Specifically, each of the recesses 40 has a trapezoidal shape with the narrower side of the trapezoid defining the access slot. Adapted to be mounted in the recess 40 is a mounting connector or bracket assembly as shown in FIGS. 4 and 5. The bracket assembly 46 includes a first body section 48 which has a cross-sectional shape corresponding to the recess 40 (see FIGS. 2 and 5). Body section 48 is sized so as to be slidably received within the recess 40. An outer section of the bracket member 46 connects to the body section 48 and in combination therewith forms V-shaped grooves or slots 50 which, as shown in FIG. 5, receive the free ends of the ribs 42. The sizing of the recesses is such as to allow the bracket to be freely slidable in a vertical direction on the ribs 42. Connected to the body and extending laterally therefrom is a mounting plate or connecting portion 54 which preferably has a screw receiving opening 56 formed therein as shown. A threaded bolt member 58 extends inwardly through a suitable threaded opening in body section 48. The screw 58 provides means for clamping the bracket 46 in a desired position of adjustment in the recess 40. As can be readily seen from FIG. 2, any number of the mounting brackets 46 could be selectively mounted in any of the vertically extending recesses 40. For example, brackets 46 could be provided in each of the corner recesses 40 and all located at the same relative elevation for connecting a plate or the like in position in the box. Alternatively, the brackets can be positioned at separately determined elevations to hold the supported components in desired positions of adjustment.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. An enclosure for electrical components and the like, comprising:

an electrically non-conductive molded plastic unitary structure having a rectangular bottom wall and four upwardly extending side walls integral therewith and joined to form a liquid tight rectangular box-like container having an upwardly open end and four upwardly extending corners at the junctures of said side walls;

each of said upwardly extending corners including a separate pair of rib members associated therewith and molded integrally with said walls and extending from said bottom wall to said open end, the respective ribs of each said pair of ribs being located on opposite sides of the associated corner with each rib having a tapered cross-section in planes parallel to the bottom wall and having a terminal end which is generally parallel to the associated corner and extends toward and terminates parallel to the terminal end of the associated rib to define a vertically extending channel with a vertical access slot, said access slot being narrower than the associated channel to provide a fastener receiving means for mounting electrical structure within said enclosure.

2. The enclosure as defined in claim 1 wherein the ribs in each pair have planar surfaces facing the interior of the enclosure which extend from the bottom to the open end and lie in the same plane.

3. An enclosure as defined in claim 1 wherein each pair of ribs is generally parallel to every other pair of ribs.

4. An enclosure as defined in claim 3 wherein said ribs each have a relatively thick base and taper to a relatively thin terminal end.

5. An enclosure as defined in claim 3 wherein said ribs are integral with the side walls.

6. An enclosure as defined in claim 1 including a support wall spaced from said bottom wall, said support wall being supported by adjustable connecting means extending from said support wall into at least one of the vertically extending channels.

7. An enclosure as defined in claim 6 wherein said adjustable connecting means are releasably clamped to the ribs which define the at least one vertically extending channel.

8. An enclosure for electrical components and the like, comprising:

an electrically non-conductive molded plastic unitary structure having a rectangular bottom wall and four upwardly extending side walls integral therewith and joined to form a liquid tight rectangular box-like container having an upwardly open end and four upwardly extending corners at the junctures of said side walls;

each of said upwardly extending corners including a separate pair of rib members associated therewith and extending from said bottom wall to said open end, each pair of ribs being generally parallel to every other pair of ribs and the respective ribs of each said pair of ribs being located on opposite sides of the associated corner with each rib having a relatively thick base tapering to a relatively thin terminal end which is generally parallel to the associated corner and extends toward and terminates parallel to the terminal end of the associated rib to define a vertically extending channel with a vertical access clot, said access slot being narrower than the associated channel to provide a fastener receiving means for mounting electrical structure within said enclosure.

* * * * *